(12) United States Patent
Bohl

(10) Patent No.: US 8,006,838 B2
(45) Date of Patent: Aug. 30, 2011

(54) METHOD FOR WRAPPING A LONG OR ROUND PART, FOR EXAMPLE A STEEL PART

(75) Inventor: Michael Bohl, Hueckeswagen (DE)

(73) Assignee: H. Bohl GmbH, Hueckeswagen (DE)

( * ) Notice: Subject to any disclaimer, the term of this patent is extended or adjusted under 35 U.S.C. 154(b) by 33 days.

(21) Appl. No.: 12/134,421

(22) Filed: Jun. 6, 2008

(65) Prior Publication Data

US 2008/0237079 A1  Oct. 2, 2008

Related U.S. Application Data

(62) Division of application No. 11/077,383, filed on Mar. 11, 2005, now Pat. No. 7,757,463.

(30) Foreign Application Priority Data

Mar. 15, 2004  (DE) .......................... 10 2004 012 474
May 13, 2004  (DE) .......................... 10 2004 023 532

(51) Int. Cl.
 *B65D 85/58* (2006.01)
(52) U.S. Cl. .......................... 206/318; 206/410; 206/497
(58) Field of Classification Search .................. 206/389, 206/410, 497, 597, 318; 53/204, 211, 449, 53/587, 588, 399; 242/470, 471
See application file for complete search history.

(56) References Cited

U.S. PATENT DOCUMENTS

| 2,552,594 | A |   | 5/1951 | Scott, Jr. |  |
| 4,409,776 | A |   | 10/1983 | Usui |  |
| 5,890,591 | A | * | 4/1999 | Pienta | 206/410 |
| 5,918,745 | A | * | 7/1999 | Main | 206/410 |
| 6,688,076 | B1 | * | 2/2004 | Rivera, Jr. | 53/204 |
| 7,353,944 | B1 | * | 4/2008 | Herman | 206/410 |
| 7,415,814 | B2 |   | 8/2008 | Itkonen et al. |  |
| 2001/0040112 | A1 | * | 11/2001 | Pienta | 206/413 |
| 2004/0211692 | A1 | * | 10/2004 | Bordner et al. | 206/389 |
| 2005/0061699 | A1 | * | 3/2005 | Itkonen et al. | 206/391 |

FOREIGN PATENT DOCUMENTS

| DE | 1192094 B | 4/1965 |
| DE | 19652054 C1 | 6/1998 |
| JP | 51-40662 | 3/1976 |
| JP | 4327108 A | 11/1992 |
| WO | 95/12528 A2 | 5/1995 |

OTHER PUBLICATIONS

EP Search Report for 05 10 1947 dated Jun. 23, 2005.

\* cited by examiner

*Primary Examiner* — Luan K Bui
(74) *Attorney, Agent, or Firm* — Lowe Hauptman Ham & Berner LLP

(57) ABSTRACT

The invention relates to a method for wrapping a long or round part, for example a steel part, for instance in the form of a steel strip coil, a steel wire roll or a round steel part such as a roller bearing ring, the steel part being wrapped in a stretch film, in particular a plastic stretch film, in a helical and covering manner. In order to realize a short term wrapping of a long or round part, irrespective of its material properties, and as a reliable transport protection the invention proposes that a strip material which is significantly more resistant than the stretch film and has an adhesive coating on the side facing the stretch film is wound over the stretch film likewise in a covering manner.

20 Claims, 3 Drawing Sheets

METHOD FOR WRAPPING A LONG OR ROUND PART, FOR EXAMPLE A STEEL PART

RELATED APPLICATIONS

Figure 1:
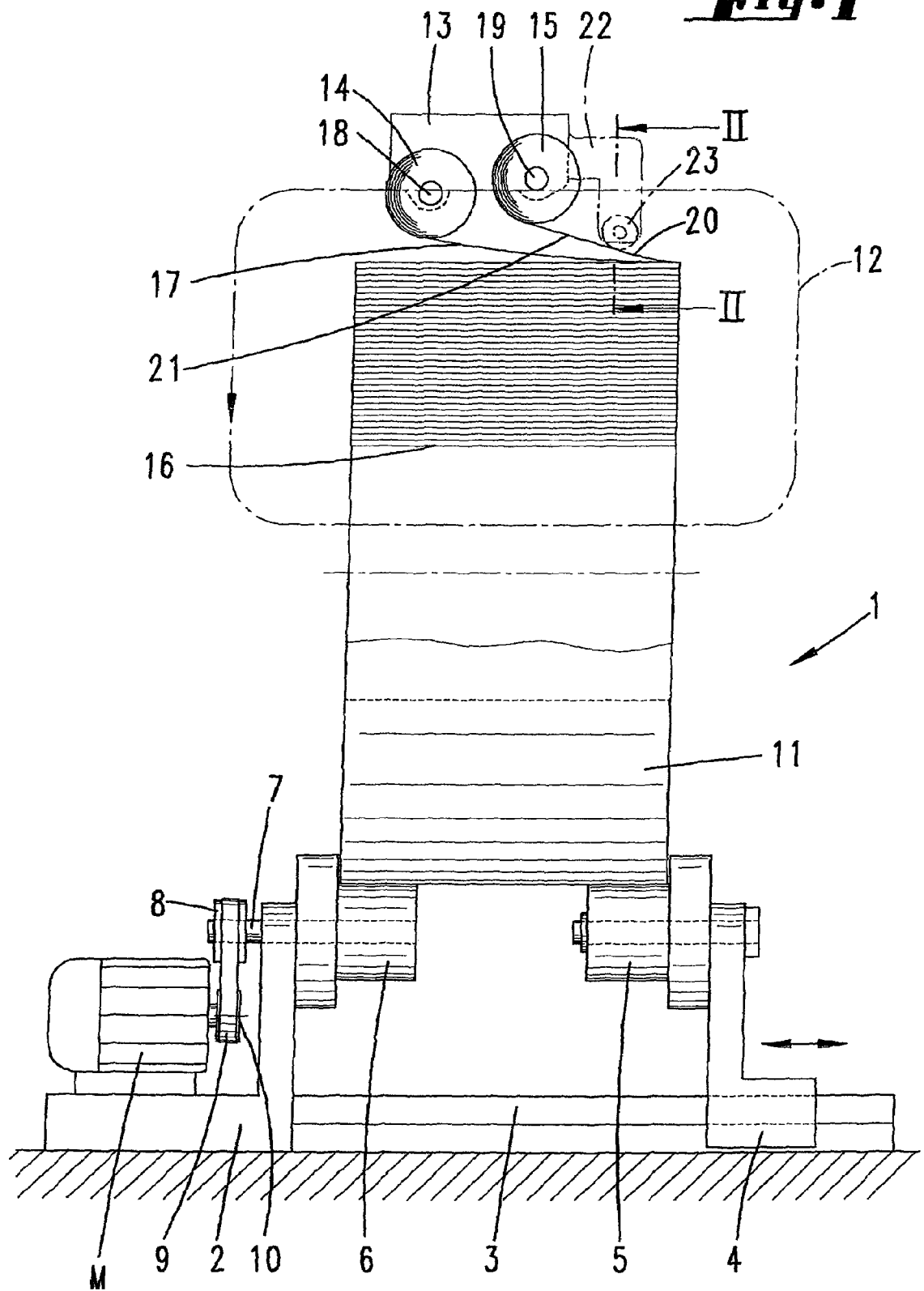

The present application is a divisional of U.S. application Ser. No. 11/077,383 filed Mar. 11, 2005 which in turn is based on, and claims priority from, German Application Number 10200423532.5 filed May 13, 2004 and German Application Number 10023532 filed Mar. 15, 2004 ,the disclosures of which are incorporated by reference herein in their entirety.

The invention relates to a method for wrapping a long or round part, for example a steel part, for instance in the form of a steel strip coil, a steel wire roll or a round steel part such as a roller bearing ring, the steel part being wrapped in a stretch film, in particular a plastic stretch film, in a helical and covering manner.

A method of the type in question is known from WO 95/12528, in which the stretch film carries in the region of its diagonally opposite longitudinal side edges adhesive strips which enter into an adhesive bond during the helical wrapping of an article to be wrapped. However, with this configuration it is not possible to avoid the first wound layer adhering with its adhesive edge to the article to be wrapped. This is disadvantageous in particular when wrapping long or round parts, since an aggressive action of the adhesive on the surface of the article to be wrapped often cannot be avoided. This is undesired for example when wrapping a steel strip coil or a steel wire roll. Optimum impact and edge protection also cannot always be provided by a wound layer applied in such a way.

It is then known from U.S. Pat. No. 4,409,776 to use a stretch film with a nonadhesive inner side and an adhesive outer side. This configuration makes it necessary to turn the stretch film through 180° after winding one layer, and after that the other wound layer must be wound with opposing pitch. Such a method is time-consuming because of the opposing windings. If only the first layer is wound, outwardly facing adhesive surfaces are exposed, which proves to be disadvantageous.

The invention is based on the object of developing a method of the generic type and a product created by means of the method in such a way that the wrapping of a long or round part can be achieved in a short time, irrespective of the nature of its material, while achieving reliable protection for transport and consequently avoiding adverse effects on the wrapped article.

This object is achieved first and foremost in the case of a method with the features of claim 1, it being provided that a strip material which is significantly more resistant than the stretch film and has an adhesive coating on the side facing the stretch film is wound over the stretch film likewise in a covering manner.

The subject matters of the further method claims 2 to 6 are explained below with reference to the method claim 1, but may also be of importance in their independent formulation.

The subclaims 7 to 10 relate to the product created by the method.

Such a configuration results in a method of the generic type by which long or round parts, in particular those with a sensitive surface, can be wrapped advantageously in such a way as to be protected for transport. The long or round part may consist for example of wood, plastic or metal. It is therefore also possible for steel parts, in particular in the form of a steel strip coil, a steel wire roll or a round steel part, such as a roller bearing ring for example, to be wrapped advantageously in such a way as to be protected for transport. Round steel parts and coils may have a diameter greater than 20 cm, in particular greater than 25 cm, in particular greater than 30 cm, in particular greater than 35 cm and more. The method of winding the significantly more resistant strip material having the adhesive coating over the stretch film brings with it the advantage of a great possibility of combining different stretch films and strip materials. In this way, optimum protection of the wrapped article can be achieved. In principle, the adhesive coating is prevented from coming into contact with the surface of the long or round part, whether it is, for example, a steel strip coil, a steel wire roll or a roller bearing. Changes to the steel part caused by aggressive adhesives therefore do not occur. There is also optimum edge protection for the wrapped long or round part. In the case of a steel strip coil, this means that loss-free processing of the same is ensured to the greatest extent. For example, it is possible, according to the size of the long or round part to be wrapped, to use a correspondingly resistant strip material. It is, however, always the case that its adhesive coating does not come into contact with the surface of the article to be wrapped. Furthermore, the edge protection is ensured, so that a multiple function of the strip material is achieved by the wrapping according to the invention. The strip material may be of such a kind that it has intrinsic reinforcement. In order to speed up the process of wrapping the article to be wrapped, the stretch film and the strip material are wound in the same operation. This means that a substantially simultaneous wrapping of the article to be wrapped by means of two strips takes place. In principle, the stretch film and the strip material run in in such a way that first the stretch film comes into contact with the article to be wrapped and only after that the strip material having the adhesive coating. The protective function is optimized by the stretch film being wound in any case in an overlapping manner in the individual helical turns. This overlapping is then covered over by the strip material, so that a helical bead runs around the article to be wrapped, providing increased protection for transport.

According to the invention, it is advantageous if the strip material is wound with a smaller width than the stretch film. The adhesive coating of the strip material, which is supplied with a time lag, can therefore never come into contact with the surface of the long or round part. With respect to the wrapping of a steel strip coil or a steel wire roll, for example, there are two possibilities. One is to perform radial winding. This means that the stretch film and the strip material are led through the central opening in the roll. The other possibility is to be seen as that of diametrically wrapping the steel strip coil or the steel wire roll, to be precise with the central opening being closed by the stretch film and the strip material. Diametrical wrapping is suitable in particular in the case of a roller bearing formed as a round steel bar of, in particular, 20 cm to 35 cm and more in size. The strip material and the stretch film can then be led around the roller bearing by means of a winding ring, for example, a rotational displacement of the roller bearing about its axis taking place at the same time. In order that greater widths of strip material can also closely follow the contours of the wrapped article, it is provided according to the invention that the winding of the strip material is carried out in the form of two or more strips in association with one strip of the stretch film. For example, a strip of the strip material of about 200 mm to 250 mm may be cut centrally or the cutting takes place during the running in of the strip material. In principle, however, it is also provided here that the plurality of strips of the strip material run in simultaneously, so that the wrapping process can be accomplished in a short time.

The product created by the method according to the invention, that is the wrapped long or round part, for example a steel strip coil, steel wire roll or roller bearing, is distinguished by the fact that a strip material which is significantly more resistant than the stretch film and has an adhesive coating on the side facing the stretch film is wound over the stretch film likewise in a covering manner. Then the stretch film is wound in any case in an overlapping manner in the individual helical turns. The strip material is also wound with a smaller width than the stretch film. Finally, the winding of the strip material is carried out in the form of two or more strips in association with one strip of the stretch film.

Figure 2:
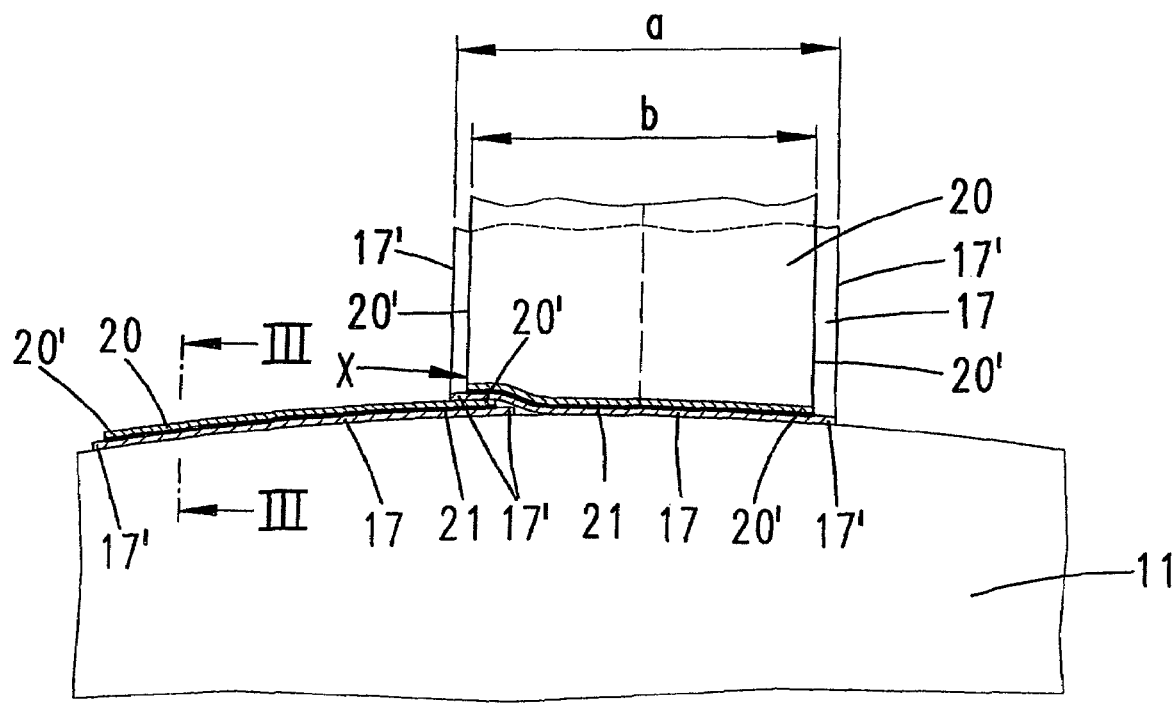
Figure 3:
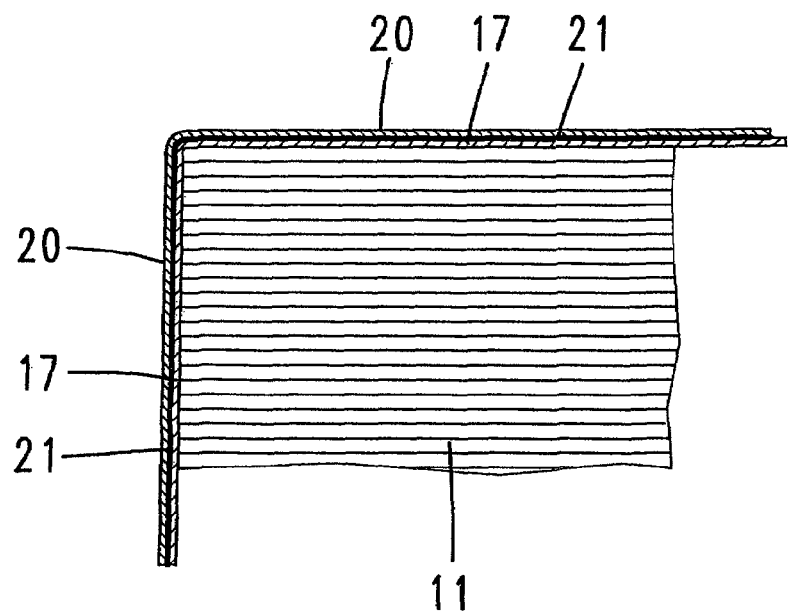
Figure 4:
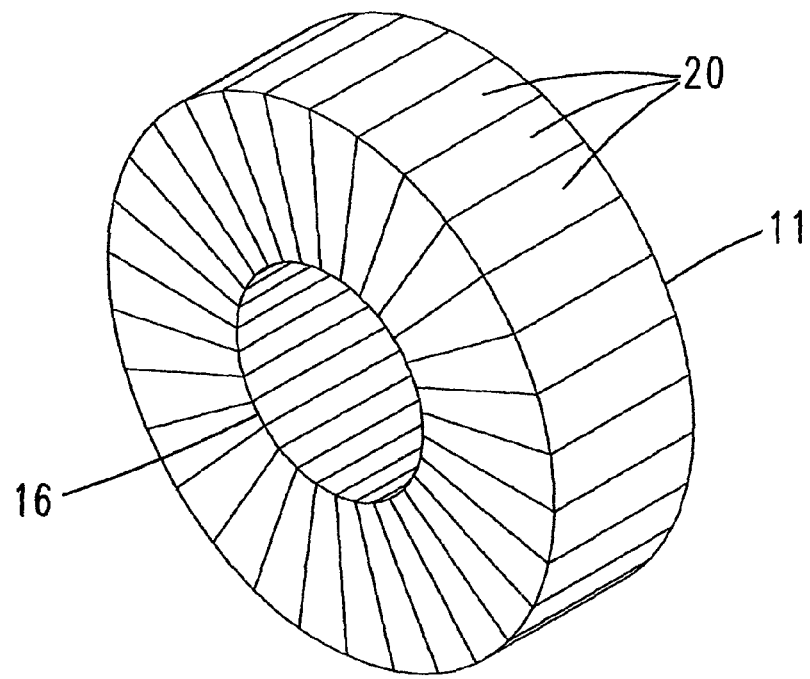
Figure 5:
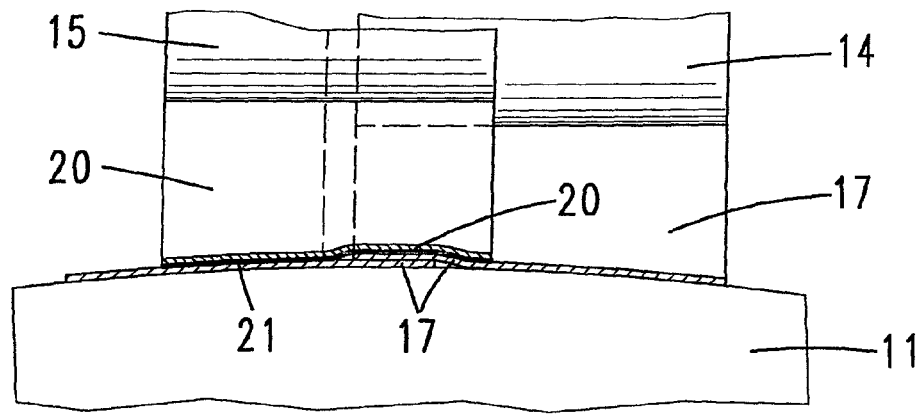
Figure 6:
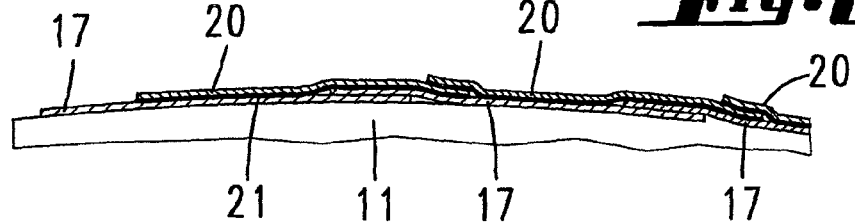

The method according to the invention is explained below on the basis of two exemplary embodiments, in which:

FIG. 1 shows a long steel part brought into the form of a steel strip coil, during the wrapping according to the first proposal for the method, FIG. 2 shows the section along the line II-II in FIG. 1, FIG. 3 shows the section along the line III-III in FIG. 2, FIG. 4 shows a steel strip coil wrapped by the method according to the invention in a perspective representation, FIG. 5 shows a representation corresponding to FIG. 2 but relating to the second way of performing the method, in the initial phase of the wrapping, and FIG. 6 shows the representation following on from FIG. 5.

An apparatus suitable for carrying out the method according to the invention is designated as a whole by the numeral 1 and is schematically represented in FIG. 1. The apparatus specifically has a base frame 2 with a guide rail 3 extending from it. Displaceably mounted on the latter is a slide 4. The latter is the carrier of a supporting roller 5. Opposite it at the same height is a further supporting roller 6. This is carried by a journal 7 of the base frame 2. Mounted on the journal 7 is a belt pulley 8, around which the drive belt 9 is placed. The latter wraps around the drive pulley 10 of a variable-speed drive motor M disposed on the base frame 2.

The two supporting rollers 5, 6 together with further supporting rollers that are not illustrated form the support for a steel strip coil 11. The latter is a steel sheet wound into a roll. The apparatus 1 serves the purpose of wrapping the steel strip coil. Since the steel strip coil may have a different width, the slide 4 is displaceable in the direction of the double-headed arrow and can be secured in position. Instead of a steel strip coil, a different round part with a different kind of material could also be wrapped. The parts concerned are in principle round parts with a surface that is not to be impaired.

Above the base frame 2, the apparatus 1 comprises a guideway 12, indicated by dashed-dotted lines. A carriage 13 is displaceable on the same in the direction of the arrow. This carriage is the carrier of two supply rolls 14, 15, disposed substantially one behind the other. The guideway 12 is aligned in such a way that the carriage 13 with the supply rolls 14, 15 is able to wrap the steel strip coil 11, the carriage 13 passing through the coil opening 16. Since the wrapping of the steel strip coil is accompanied by a slow rotation of the steel strip coil, helical wrapping of the steel strip coil 11 takes place.

A plastic stretch film 17 is unwound from the supply roll 14. This film has the tendency to cling, but not bond, to the material of the steel strip coil 11. The supply roll 14, rotatably disposed on a spindle 18 of the carriage 13, is controlled by a braking device (not illustrated) in such a way that the plastic stretch film 17 is wound around the steel strip coil with an intended tensile stress.

Offset in height with respect to the spindle 18, a spindle 19 for the supply roll 15 extends in such a way that this spindle 19 is at a greater distance from the center axis of the steel strip coil than the spindle 18. A strip material 20 significantly more resistant than the stretch film 17 is drawn off from the supply roll 15. On the side facing the stretch film 17, the strip material is provided with an adhesive coating 21. The latter is suitable for entering into an intimate adhesive bond with the plastic stretch film 17. With respect to the strip material 20, there is a great freedom of choice with regard to the material. This can even include fabric-reinforced strips. It is important, however, that a high degree of protection for transport is achieved by the strip material 20.

As FIG. 1 shows, the stretch film 17 and the strip material 20 are wound in the same operation. This takes place by the stretch film 17 being wound in any case in an overlapping manner in the individual helical turns, compare FIGS. 2, 5 and 6 in particular in this respect. It is important here that the strip material 20 is wound with a smaller width than the plastic stretch film 17.

FIGS. 1 and 2 clearly show that the supply rolls 14, 15 provided lie one behind the other in the same plane. The plastic stretch film 17 drawn off from the supply roll 14 has a width a. The width b of the strip material 20 is less than the width a in such a way that the side edges 17' of the stretch film 17 protrude slightly over the side edges 201 of the strip material 20.

During helical wrapping of the steel strip coil 11, both the edge zones of the plastic stretch film 17 and those of the strip material 20 overlap, so that in the overlapping region X four layers that are led helically around the steel strip coil 11 lie alternately one on top of the other. As a result, a particularly resistant protective zone is created, so that altogether transport damage to the material of the steel strip coil is largely avoided.

According to FIG. 1, it is indicated by dashed-dotted lines that the carriage 13 may include an extension arm 22, which is the carrier of a cutting knife 23. With this it is possible to cut the width of the strip material 20 into a plurality of strips, which run in simultaneously during the wrapping process. In the case of the exemplary embodiment, a cutting knife 23 is used, so that the strip material 20 is cut into two individual parts by a central cut, as indicated. If need be, however, it is also possible to use a plurality of cutting knives 23, to obtain strips of a smaller width. The advantage of cutting the strip material into a plurality of strips in this way brings with it the advantage that the strips in the edge region of the article to be wrapped have the effect of reducing the tendency to crease. The cutting device is designed in such a way that it can be used according to choice and can be switched off.

According to FIGS. 5 and 6, the supply rolls 14, 15 are not disposed in the same plane, but are offset in relation to each other. As before, however, helical wrapping of the steel strip coil 11 takes place. Firstly, the plastic stretch film 17 runs in. After one wound layer of the plastic stretch film 17 for example, the strip material 20 which contains the adhesive coating 21 on its side facing the stretch film 17 is then supplied. Here, too, it is ensured that the adhesive coating 21 does not come into direct contact with the surface of the steel strip coil 11, but only with the facing side of the plastic stretch film 17.

As illustrated by FIGS. 5 and 6 in particular, a three-layered bead is produced in the overlapping region of the stretch film 17 and strip material 20, leading to increased impact protection.

In principle, however, it is ensured with both types of wrapping that immovable wound layers are produced on the steel strip coil 11. These bring with them the advantage of high corrosion protection and, in addition, prevent damage to the long steel part, whether it is a steel wire roll, a steel strip coil or a round part of a different kind of material and surface.

While the two types of method described above concern radial wrapping, it is also possible to envelop round/steel parts such as roller bearings by diametrical wrapping, for example by means of a winding ring. During the winding process, the roller bearing rotates, so that helical wound layers can likewise be produced.

An apparatus having a winding ring is also suitable for wrapping long parts, that is elongate parts. The nature of the material of the long parts is unimportant. For example, wood or plastic profiles could be wrapped in the way described above. The long part could consist of metal, in particular steel. In principle, the surface of the long part to be wrapped is stopped from coming into contact with the adhesive coating.

All features disclosed are (in themselves) pertinent to the invention. The disclosure content of the associated/attached priority documents (copy of the prior patent application) is also hereby incorporated in full in the disclosure of the application, including for the purpose of incorporating features of these documents in claims of the present application.

The invention claimed is:

1. A wrapped article comprising:
    a long or round part;
    a stretch film wound around the part in a helical and covering manner; and
    a strip of material wound over the stretch film in a helical and covering manner, the strip of material being significantly more resistant than the stretch film and having an adhesive coating on a side facing the stretch film, and the stretch film being interposed between the adhesive coating and the part.

2. The wrapped article according to claim 1, wherein the winding of the strip of material is carried out in the form of two or more strips in association with one strip of the stretch film.

3. The wrapped article according to claim 1, wherein the part comprises a steel part.

4. The wrapped article according to claim 1, wherein the part comprises a steel strip coil.

5. The wrapped article according to claim 1, wherein the part comprises a steel wire roll.

6. The wrapped article according to claim 1, wherein the part comprises a roller bearing.

7. The wrapped article according to claim 1, wherein a portion of the stretch film is wound to overlap a portion of the strip of material.

8. The wrapped article according to claim 1, wherein the strip of material comprises fabric-reinforced strip.

9. A wrapped article comprising:
    a long or round part;
    a stretch film wound around the part in a helical and covering manner; and
    a strip of material wound over the stretch film in a helical and covering manner, the strip of material being significantly more resistant than the stretch film and having an adhesive coating on a side facing the stretch film, and the stretch film being interposed between the adhesive coating and the part;
    wherein the stretch film is wound in an overlapping manner in individual helical turns.

10. The wrapped article according to claim 9, wherein the strip of material has a smaller width than the stretch film.

11. The wrapped article according to claim 9, wherein the part comprises a steel part.

12. The wrapped article according to claim 9, wherein the part comprises a roller bearing.

13. The wrapped article according to claim 9, wherein a portion of the stretch film is wound to overlap a portion of the strip of material.

14. The wrapped article according to claim 9, wherein the strip of material comprises fabric-reinforced strip.

15. A wrapped article comprising:
    a long or round part;
    a stretch film wound around the part in a helical and covering manner; and
    a strip of material wound over the stretch film in a helical and covering manner, the strip of material being significantly more resistant than the stretch film and having an adhesive coating on a side facing the stretch film, and the stretch film being interposed between the adhesive coating and the part;
    wherein the strip of material has a smaller width than the stretch film.

16. The wrapped article according to claim 15, wherein the stretch film is wound in an overlapping manner in individual helical turns.

17. The wrapped article according to claim 15, wherein the part comprises a steel part.

18. The wrapped article according to claim 15, wherein the part comprises a roller bearing.

19. The wrapped article according to claim 15, wherein a portion of the stretch film is wound to overlap a portion of the strip of material.

20. The wrapped article according to claim 15, wherein the strip of material comprises fabric-reinforced strip.

* * * * *